United States Patent [19]

Fogg et al.

[11] Patent Number: 5,710,231
[45] Date of Patent: Jan. 20, 1998

[54] ISOCYANATE-REACTIVE COMPOSITIONS CONTAINING INTERNAL MOLD RELEASE AGENTS

[75] Inventors: Brian Fogg, Rochester Hills, Mich.; Herbert Russell Gillis, West Deptford, N.J.; Nai Wen Lin, Rochester Hills, Mich.

[73] Assignee: Imperial Chemical Industries PLC, London, England

[21] Appl. No.: 604,146

[22] Filed: Feb. 20, 1996

Related U.S. Application Data

[63] Continuation of Ser. No. 224,892, Apr. 8, 1994, abandoned.

[51] Int. Cl.⁶ .................................................. C08G 18/10
[52] U.S. Cl. ...................... 528/59; 528/60; 528/65; 528/66; 521/155; 521/159; 264/300; 252/182.24; 252/182.27
[58] Field of Search ...................... 528/59, 60, 65, 528/66; 521/155, 159; 264/300; 252/182.24, 182.27

[56] References Cited

U.S. PATENT DOCUMENTS

| | | | |
|---|---|---|---|
| 3,470,250 | 9/1969 | Patterson et al. | 260/583 |
| 3,485,875 | 12/1969 | Menapace | 260/583 |
| 3,541,041 | 11/1970 | Hermann et al. | 260/32.6 |
| 4,162,999 | 7/1979 | Bohemen | 260/28.5 |
| 4,585,803 | 4/1986 | Nelson et al. | 521/105 |
| 4,753,966 | 6/1988 | Haas et al. | 521/51 |
| 4,876,019 | 10/1989 | Meyer et al. | 252/32.5 |
| 4,895,879 | 1/1990 | Nelson et al. | 521/105 |
| 4,897,428 | 1/1990 | Dewhurst et al. | 521/115 |
| 4,919,878 | 4/1990 | Pilger et al. | 264/300 |
| 4,969,952 | 11/1990 | Hattich et al. | 106/38.24 |
| 5,008,033 | 4/1991 | Meyer et al. | 252/182.13 |
| 5,011,647 | 4/1991 | Meyer et al. | 264/300 |

Primary Examiner—Duc Truong

[57] ABSTRACT

An isocyanate-reactive composition is provided which comprises:

(a) at least one compound having a plurality of isocyanate-reactive groups; and (b) a fatty polyamine having the formula:

$$R^1-(NH-R^2)_x-NH_2$$

wherein $R^1$ is an alkyl group containing 8 to 40 carbon atoms, $R^2$ is a divalent linking group containing 1 to 8 carbon atoms and x has a value of 1 to 4. Methods for preparing flexible foam articles utilizing the isocyanate-reactive compositions are also provided.

25 Claims, No Drawings

ISOCYANATE-REACTIVE COMPOSITIONS CONTAINING INTERNAL MOLD RELEASE AGENTS

This application is a continuation of Ser. No. 08/224,892 filed Apr. 8, 1994 now abandoned.

FIELD OF THE INVENTION

This invention relates to isocyanate-reactive compositions employed in the preparation of polyurethane and polyurea articles. More particularly, the invention pertains to isocyanate-reactive compositions containing fatty polyamine internal mold release agents used in the preparation of polyurethane and polyurea flexible foam articles.

BACKGROUND OF THE INVENTION

The preparation of polyurethane and polyurea molded articles, including flexible foam articles, by reacting organic polyisocyanates and isocyanate reactive compounds is well known in the art. Generally, a polyurethane article is prepared by reacting a polyisocyanate with an isocyanate-reactive composition containing a polyol, and a polyurea article is prepared by reacting a polyisocyanate with an isocyanate-reactive composition containing an amine and/or water. When a foamed article is prepared, a blowing agent is usually included in the isocyanate reactive composition.

In order for molded articles to be economically prepared, it is essential that the articles be easily removed from the mold without being damaged. As a result, an external mold release agent, such as a soap or a wax, is usually used when molded articles are prepared. There are, however, several disadvantages in using such external mold release agents. One disadvantage is that the external mold release agent tends to cling to the molded articles which requires that the release agent be applied almost every time the mold is used, thereby adding substantially to the time and cost of producing molded articles. Another disadvantage is that the external mold release agent that clings to the molded article must sometimes be removed from the article's surface before the article can be further treated and finished. A further disadvantage is that residue from the external mold release agent builds up as the mold is repeatedly used. This buildup eventually covers and obscures details on the mold cavity surface. As a result, the buildup must be periodically removed thereby adding to the cost and time of production.

Due to the disadvantages of using external mold release agents alone, internal mold release agents are customarily used in conjunction with external mold release agents in order to significantly reduce the frequency with which the external mold release agent must be applied to the mold. Metal carboxylate salts, such as zinc stearate, are well known internal mold release agents in the preparation of polyurethane and polyurea molded articles prepared by reaction injection molding (RIM). However, since metal carboxylate salts tend to be incompatible with the polyols used to prepare such articles, a compatibilizer or solubilizer for the salts is used, thereby adding to the cost of producing the articles. Another problem with using metal carboxylate salts is that they do not react with the polyisocyanate and have a tendency to migrate to the surface of the molded article after the polymerization is essentially complete. This migration is particularly undesirable and can interfere with post-curing treatments and applications requiring adhesion or painting.

For decades, there has been a search for an adequate internal mold release agent for flexible polyurethane and polyurea foams. Although metal carboxylates have excellent mold release characteristics in high density polyurethane and polyurea foam and elastomer applications (e.g., reaction injection molding) when used with compatibilizing or solubilizing compounds, they have not displayed the same characteristics in the preparation of flexible foams. This is due in large part to the great difficulty of solubilizing metal carboxylates in the presence of water, which is usually present as the blowing agent. Thus, metal carboxylate salts have not solved the need for an adequate internal mold release agent for flexible foams.

Applicants have solved that need by discovering fatty polyamine internal mold release agents that can be used in the preparation of flexible foams, including low density flexible foams. Unlike metal carboxylate internal mold release agents, the fatty polyamine internal mold release agents are compatible with the components used to prepare polyurethane and polyurea flexible foam molded articles, react with the polyisocyanates used to make the article, and do not adversely affect the physical characteristics of the articles.

Although amines have been used as compatibilizers and solubilizers for metal carboxylate internal mold release agents in the preparation of various polyurethane and polyurea articles, it has not been disclosed that such amines can be used as internal mold release agents by themselves in the preparation of flexible foam articles. For example U.S. Pat. Nos. 4,585,803 and 4,895,879 disclose the use of tertiary amines as compatibilizing compounds for metal carboxylates in an isocyanate-reactive composition. U.S. Pat. Nos. 4,876,019, 5,008,033 and 5,011,647 and European Patent No. 0314816 disclose the use of amines as solubilizing compounds for metal carboxylates in isocyanate-reactive compositions. U.S. Pat. No. 4,897,428 discloses the use of fatty amine derivatives as compatibilizers for zinc carboxylates. However, none of these patents discloses that fatty amines can be used as internal mold release agents in the preparation of polyurethane and polyurea flexible foam articles.

Other patents, however, disclose that some fatty amine derivatives have mold release properties. For example, U.S. Pat. No. 3,541,041 discloses that hydroxylated fatty amines can be incorporated into polyamide molding compositions as mold parting agents. This patent, however, only discloses hydroxyalkylated fatty monoamines and does not disclose that fatty amine derivatives can be employed as internal mold release agents in the preparation of thermosetting polyurethane and polyurea articles.

U.S. Pat. Nos. 3,485,875 and 3,470,250 disclose that secondary alkyl primary monoamines having from 10 to 25 carbon atoms can be used as mold release agents. However, the patent does not disclose the use of any fatty polyamines for this purpose. Such mono-functional amines are generally less desirable than polyamines because the mono-amines can result in dead-ended polymeric claims (i.e. "termination") which can detract from the physical properties of the produced foam and interfere with processing.

U.S. Pat. No. 4,969,952 discloses an aqueous external mold release composition used in the preparation of polyurethane foamed articles. The composition is comprised of a fatty amine having at least one alkyl radical containing 12 to 24 carbon atoms, an emulsified oil or wax, and an ammonium salt.

U.S. Pat. No. 4,162,999 discloses that an aliphatic amine containing 8 to 24 carbon atoms can be employed in the preparation of sheets from chlorine containing elastomers to prevent the sheets from sticking to one another.

U.S. Pat. No. 4,919,878 discloses an internal mold release composition comprised of salts of carboxylic acids and tertiary monoamines, including tertiary fatty monoamines.

None of these patents, however, disclose that fatty polyamines can be used as internal mold release agents in the preparation of polyurethane and polyurea flexible foam articles.

It is thus an object of this invention to provide an isocyanate-reactive composition which can be used to prepare polyurethane and polyurea flexible foam articles which contains a reactive internal mold release agent.

It is another object to provide an isocyanate-reactive composition which can be used for preparing polyurethane and polyurea flexible foam articles which contains an internal mold release agent that does not require the presence of a compatibilizing or solubilizing compound.

It is yet another object to provide an isocyanate-reactive composition that can be used to prepare molded flexible polyurethane and polyurea foams that can be readily removed from a mold.

These and other objects are achieved by the isocyanate reactive compositions of this invention and their use.

SUMMARY OF THE INVENTION

The present invention relates to the preparation of polyurethane and polyurea flexible foam articles which can be readily removed from a mold. These articles are prepared by reacting a polyisocyanate with an isocyanate-reactive composition. The isocyanate-reactive composition comprises:

(a) at least one compound having a plurality of isocyanate-reactive groups; and (b) a fatty polyamine having the formula

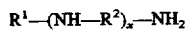

$$R^1-(NH-R^2)_x-NH_2$$

wherein $R^1$ is an alkyl group containing 8 to 40 carbon atoms, $R^2$ is a divalent linking group containing 1 to 8 carbon atoms, and x has a value in the range of 1 to 4.

The reaction system from which the molded articles are prepared comprises:

(a) an organic polyisocyanate; and (b) an isocyanate-reactive composition comprising:
  (i) at least one compound having a plurality of isocyanate-reactive groups; and
  (ii) a fatty polyamine having the formula

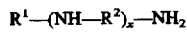

$$R^1-(NH-R^2)_x-NH_2$$

wherein $R^1$ is an alkyl group containing 8 to 40 carbon atoms, $R_2$ is a divalent linking group containing 1 to 8 carbon atoms, and x has a value in the range of 1 to 4.

The process for preparing molded polyurethane or polyurea flexible foam articles according to the present invention comprises the steps of:

(a) introducing into a mold an organic polyisocyanate and an isocyanate-reactive composition comprising:
  (i) at least one compound having a plurality of isocyanate-reactive groups; and
  (ii) a fatty polyamine having the formula

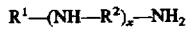

$$R^1-(NH-R^2)_x-NH_2$$

wherein $R^1$ is an alkyl group containing 8 to 40 carbon atoms, $R^2$ is a divalent linking group containing 1 to 8 carbon atoms, and x has a value in the range of 1 to 4;

(b) reacting the organic polyisocyanate and the isocyanate-reactive composition to form a molded article; and (c) removing the molded article from the mold.

In yet another embodiment, the present invention encompasses a process for preparing molded polyurethane or polyurea flexible foam articles comprising the steps of:

(a) introducing into a mold an organic polyisocyanate, a blowing agent and an isocyanate-reactive composition comprising:
  (i) at least one compound having a plurality of isocyanate-reactive groups; and
  (ii) a fatty polyamine having the formula:

$$R^1-(NH-R^2)_x-NH_2$$

wherein $R^1$ is an alkyl group containing 8 to 40 carbon atoms, $R^2$ is a divalent linking group containing 1 to 8 carbon atoms and x has a value in the range of 1 to 4;

(b) reacting the isocyanate, blowing agent and isocyanate-reactive composition to form a molded flexible article; and (c) removing the molded article from the mold.

The use of fatty polyamines as internal mold release agents permits polyurethane and polyurea flexible foam articles to be readily removed from a mold.

DETAILED DESCRIPTION OF THE INVENTION

As used herein, the term "flexible foam" includes low density, medium density and high density flexible foams, including high density/high hardness foams commonly referred to as integral skin foams.

The fatty polyamines suitable for use as internal mold release agents have the formula

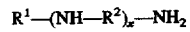

$$R^1-(NH-R^2)_x-NH_2$$

wherein $R^1$ is an alkyl group containing about 8 to about 40 carbon atoms, $R^2$ is a divalent linking group containing about 1 to about 8 carbon atoms, and x has a value in the range of about 1 to about 4. Preferably, $R^1$ is a linear alkyl group containing about 12 to about 35 carbon atoms, $R^2$ is an alkylene group containing about 2 to about 4 carbon atoms, and x has a value in the range of about 1 to about 3. Monoamines of the formula above (i.e., when x is 0) are not nearly as effective as internal mold release agents and are more difficult to solubilize. As a result, the fatty polyamines of the present invention should be employed, not fatty monoamines. $R^1$ and $R^2$ can be linear or branched and saturated or unsaturated. However, it is preferred for $R^1$ and $R^2$ to be linear and saturated. Preferably, $R^1$ is selected from the group consisting of linear decyl, dodecyl, hexadecyl and octadecyl. The most preferred fatty polyamines according to the present invention are the polyamines wherein $R^1$ is octadecyl, $R^2$ is —$(CH_2)_3$— and x has a value in the range of 1 to 3.

The fatty amines may be prepared by conventional methods. Generally, they are prepared by sequential cyanoethylation reduction reactions. Most of the fatty amines are readily available commercially. For example, the most preferred fatty amines wherein $R^1$ is octadecyl, $R^2$ is —$(CH_2)_3$— and x is 1, 2 or 3 are available from Exxon Chemical Company under the trademark TALLOW DIAMINE®, TALLOW TRIAMINE® and TALLOW TETRAMINE®, respectively.

The fatty amines of this invention are compatible with the compounds that are reacted with polyisocyanates to prepare polyurethane and polyurea articles. They may, therefore, be used as internal mold release agents without compatibilizers or solubilizers. Although they may be used as internal mold release agents in the preparation of any molded polyurethane or polyurea article (e.g. flexible foam articles, rigid foam articles, RIM articles, etc.) they have unexpectedly been found to be most useful as internal mold release agents for flexible foam polyurethane and polyurea articles, particularly low density flexible foam articles. When used to prepare RIM articles, the fatty amines are most effective when used in combination with a polysiloxane internal mold release agent. However, a polysiloxane internal mold release agent cannot be used with the fatty amine internal mold release agents to prepare flexible foams because the polysiloxane is a defoaming agent and will cause the foam to collapse.

As is well known in the art, polyurethane and polyurea molded articles are generally prepared by mixing together an A component containing the polyisocyanate(s) and a B component containing the isocyanate-reactive compound(s). The fatty amine internal mold release agents are usually incorporated into the B (or isocyanate-reactive) component, so that an isocyanate-reactive composition containing the fatty amine is prepared prior to reaction of the polyisocyanate and the isocyanate-reactive compounds. Generally the fatty polyamine is present at a level of about 0.5 to about 10 percent by weight, preferably about 0.5 to about 5 percent by weight and most preferably about 1 to about 2 percent by weight based upon the total weight of the isocyanate-reactive composition.

The organic polyisocyanates which may be used in the preparation of the polyurethane and polyurea flexible foam articles include any of the aliphatic, cycloaliphatic, araliphatic or aromatic polyisocyanates known in polyurethane or polyurea chemistry, especially those that are liquid at room temperature. Examples of suitable polyisocyanates include ethylene diisocyanate, 1,6-hexamethylene diisocyanate, isophorone diisocyanate, cyclohexane 1,4-diisocyanate, 4,4'-dicyclohexylmethane diisocyanate, 1,4-xylylene diisocyanate, 1,4-phenylene diisocyanate, 2,4-toluene diisocyanate, 2,6-toluene diisocyanate, 4,4'-diphenylmethane diisocyanate, 2,4'-diphenylmethane diisocyanate, polymethylene polyphenylene polyisocyanates (crude MDI) and 1,5-naphthylene diisocyanate. Mixtures of these polyisocyanates can also be used. Also, polyisocyanates which have been modified by the introduction of urethane, allophanate, urea, biuret, carbodiimide, uretonimine or isocyanurate residues can be used.

In general, the aromatic polyisocyanates are preferred. The most preferred aromatic polyisocyanates are 4,4'-diphenylmethane diisocyanate, 2,4'-diphenylmethane diisocyanate, polymeric MDI, MDI variants, and mixtures thereof. Suitable MDI variants include compounds in which the MDI has been modified by the introduction of urethane, allophanate, urea, biuret, amide, carbodiimide, uretonimine and/or isocyanurate residues can be used.

Isocyanate-terminated prepolymers may also be employed and are prepared by reacting an excess of polyisocyanate with polyols, including aminated polyols or imines/enamines thereof, or polyamines. A particularly preferred isocyanate terminated prepolymer is the reaction product of an MDI stream and a polyether polyol, especially a polyether polyol having a molecular weight in the range of 400 to 10,000.

Compounds containing a plurality of isocyanate-reactive groups which may be present in the isocyanate-reactive compositions of the invention include compounds having a molecular weight of from about 18 to 12,000 and an average of two or more isocyanate-reactive groups per molecule. Preferably, the compounds containing a plurality of isocyanate-reactive groups have a molecular weight of about 1500 to about 10,000, and contain about 2 to about 4 hydroxy groups per molecule. The isocyanate-reactive compositions usually include water. Examples of isocyanate-reactive groups which may be present in these compounds include hydroxyl, thiol, primary amino, secondary amino, imino-functional and enamine groups, and mixtures of such groups.

Polymers containing a plurality of isocyanate-reactive groups which may be present in the isocyanate-reactive compositions of the present invention include polyols, polyamines, imino-functional polymers, enamine-containing polymers and mixtures thereof. Suitable isocyanate-reactive compositions are described in U.S. Pat. No. 4,935,460, the disclosure of which is incorporated herein by reference.

Polymeric polyols having molecular weights in the range from of 1,500 to 10,000 are preferred. Such polyols are well known as polyurethane components and may be prepared by methods fully described in the prior art. Preferably, the polyols are selected from the group consisting of polythioether, polyester, polyesteramide, polycarbonate, polyacetal, polyolefin, polysiloxane and polyether polyols. Polyether polyols are the preferred polyols.

Suitable polyether polyols include products obtained by the polymerization of a cyclic oxide, for example, ethylene oxide, propylene oxide or tetrahydrofuran in the presence, where necessary, of polyfunctional initiator compounds. Suitable initiator compounds contain a plurality of active hydrogen atoms and include water, polyols (for example ethylene glycol, propylene glycol, diethylene glycol, resorcinol, bisphenol A, glycerol, trimethylolpropane, 1,2,6-hexanetriol, triethanolamine, pentaerythritol, sorbitol or sucrose), ammonia, primary monoamines (for example, aniline or benzylamine), polyamines (for example, ethylene diamine, hexamethylene diamine, toluene diamines or diaminodiphenylmethanes) and polymethylene polyphenylene polyamines obtained by the condensation of aniline and formaldehyde, and aminoalcohols (for example ethanolamine and diethanolamine). Mixtures of initiators and/or cyclic oxides may also be used.

Especially useful polyether polyols include polyoxypropylene, polyoxyethylene, and poly(oxyethylene-oxypropylene) diols and triols, which are obtained by the simultaneous or sequential addition of ethylene and propylene oxides to appropriate di- or tri-functional initiators as fully described in the prior art. Mixtures of the diols and triols are also useful. Because of their enhanced reactivity, ethylene oxide tipped polyols are often preferred.

Polyester polyols which may be used include hydroxyl terminated reaction products of polyhydric alcohols such as ethylene glycol, propylene glycol, diethylene glycol, 1,4-butanediol, bis(hydroxyethyl) terephthalate, glycerol, trimethylolpropane, pentaerythritol or mixtures thereof with polycarboxylic acids, especially dicarboxylic acids or their ester-forming derivatives, for example, succinic, glutaric and adipic acids or their dimethyl esters, sebacic acid, phthalic anhydride, tetrachlorophthalic anhydride or dimethyl terephthalate. Polyesters obtained by the polymerization of lactones, for example caprolactone, in conjunction with a polyol may also be used. Polyesteramides may be obtained by the inclusion of aminoalcohols such as ethanolamine in polyesterification mixtures. Preferred polyester polyols are diols or triols of molecular weight from about 1500 to about 10,000.

Polythioether polyols which may be used include products obtained by condensing thiodiglycol either alone or with other glycols, dicarboxylic acids, formaldehyde, aminoalcohols or aminocarboxylic acids.

Polycarbonate polyols which may be used include products obtained by reacting diols such as 1,3-propanediol, 1,4-butanediol, 1,6-hexanediol, diethylene glycol or tetraethylene glycol with diaryl carbonates, for example, diphenyl carbonate or with phosgene.

Polyacetal polyols which may be used include those prepared by reacting glycols such as diethylene glycol, triethylene glycol or hexanediol with formaldehyde. Suitable polyacetals may also be prepared by polymerizing cyclic acetals.

Suitable polyolefin polyols include hydroxy-terminated butadiene homo- and copolymers, and suitable polysiloxane polyols include polydimethylsiloxane diols and triols.

Polymeric polyamines having molecular weights in the range of from about 1,500 to about 12,000 are well known as components of polyurea forming reaction mixtures and may be prepared by methods fully described in the prior art as will be recognized by the artisan in view of the present disclosure. As examples of suitable polyamines, there may be mentioned amino-terminated polythioethers, polyesters, polyesteramides, polycarbonates, polyacetals, polyolefins, polysiloxane and, especially polyethers obtained by replacing the hydroxy groups of the corresponding polyols partially or completely by secondary or preferably primary amino groups. The preferred polymeric polyamines are polyether diamines and triamines, especially polyoxypropylene diamines and triamines.

Suitable imino-functional polymers having a molecular weights in the range from about 1,500 to about 12,000, along with methods for their preparation, are described in U.S. Pat. No. 4,794,129, which is incorporated herein by reference.

The preferred imino-functional polymers are imine-terminated polyethers such as may be obtained by reacting an aldehyde or ketone with a polyether polyamine, especially a polyoxypropylene diamine or triamine.

Enamine functional polymers having a molecular weight in the range of from about 1,500 to about 12,000 may be prepared either from secondary amine terminated resins (i.e. polyethers) by reaction with ketones/aldehydes having one or more alpha hydrogens, or by reacting ketone/aldehyde terminated resins (bearing alpha hydrogens) with secondary amines, providing for removal of the $H_2O$ formed in the reactions. Secondary amine terminated resins can be obtained, for example, by catalytic hydrogenation of the imino-functional polymers described hereinabove. Ketone/aldehyde terminated resins may be obtained, in general, by oxidation of the corresponding secondary or primary hydroxyl terminated resin. More highly reactive enamine functional polymers can be prepared by oxidizing a primary hydroxy functional resin to the corresponding polycarboxylic acid, conversion of the acid groups to ortho esters, and treatment of the latter with an excess of a secondary amine. Each orthoester must contain at least one alpha hydrogen atom.

Polymers containing a plurality of isocyanate-reactive groups for inclusion in the isocyanate-reactive compositions of the invention preferably have molecular weights in the range of from about 2,000 to about 10,000 and have isocyanate-reactive functionalities of from about 2 to about 4, preferably about 2 to about 3. Aliphatic polyether-based polymers (with multiple isocyanate-reactive groups) are most preferred.

Particularly important isocyanate-reactive compositions contain a combination of a relatively high molecular weight (i.e., above 1,500) polymer containing a plurality of isocyanate-reactive groups (usually referred to as a "softblock") and a relatively low molecular weight (i.e., below 1,500) compound (which may be, or include, water) containing a plurality of isocyanate-reactive groups, usually known as a chain extender. The present isocyanate-reactive systems comprise about 10 to about 99 wt % of softblock. Preferably the present compositions comprise about 20 to about 95, most preferably about 25 to about 95, and even more preferably about 30 to about 95 wt % of softblock.

Chain extenders having molecular weights below 1,500 which may be present in the isocyanate-reactive compositions of the invention have been fully described in the prior art and include polyols, polyamines, imines, enamines, especially diols and diamines. Mixtures of different chain extenders may be used if desired. Preferred chain extenders have molecular weights below 800 and often below 500.

Polyols which may be used as chain extenders include ethylene glycol and 1,4-butanediol. Polyamines which may be used as chain extenders include aliphatic polyamines, especially diamines, and aromatic polyamines, especially sterically hindered diamines. Ethylene diamine and low molecular weight polyether diamines are examples of suitable aliphatic polyamines while suitable aromatic diamines include 3,5-diethyl-2,4-toluenediamine, 3,5-diethyl-2,6-toluenediamine and mixtures thereof, (referred to as DETDA) 4,4'- and 2,4'-diaminodiphenylmethanes and mixtures thereof, 2,4- and 2,6-diaminotoluenes and mixtures thereof, 1,3,5-triisopropyl-2,4diaminobenzene, 1,3,5-triethyl-2,4-diaminobenzene 3,3'5,5'-tetraisopropyl-4,4'-diaminodiphenylmethane and the like. Other chain extenders which may be used include imino-functional compounds as described in U.S. Pat. No. 4,794,129 and enamines. Particular chain extenders useful for a specific application and their amounts will be evident to one skilled in the art from the present disclosure.

The reaction systems of the invention may also contain other conventional ingredients, the ingredients usually being present in the isocyanate-reactive compositions of the invention. Such ingredients include catalysts (for example, tin compounds and tertiary amines), surface-active agents and foam stabilizers (for example, siloxaneoxyalkylene copolymers), flame retardants, plasticizers, dyes, fillers and reinforcing agents. Specific ingredients to be used and their amounts as needed for a particular application will be evident to one skilled in the art from the present disclosure.

In the molding process, the techniques and equipment used may be those that have been fully described in the prior art.

The production of molded flexible foam articles from organic polyisocyanate and isocyanate-reactive components is well known. .For example, such articles can be prepared according to the teachings of U.S. Pat. No. 4,990,548, which is incorporated herein by reference. One method of preparing such articles is by machine mixing (e.g. impingement mixing) two highly reactive liquid streams, one containing a polyisocyanate and the other containing isocyanate-reactive components, for example polyol and/or polyamine reactants, and rapidly injecting the streams into a mold cavity. By this method, high production rates of molded polyurethane and polyurea flexible foam articles having excellent physical properties can be achieved.

In the present invention, the ratio of isocyanate groups in the organic polyisocyanate component to isocyanate-reactive groups in the isocyanate-reactive component is generally between about 0.6 and about 1.5, preferably about 0.75 and 1.25 and most preferably about 0.8 and 1.05. This processing ratio is referred to in the art as the "index".

In order to prepare polyurethane and polyurea flexible foam articles, a blowing agent is used. Suitable blowing agents for preparing such foams, include water, dissolved or dispersed gases (such as air, carbon dioxide, nitrous oxide and nitrogen), and low boiling halogenated hydrocarbons (such as methylene chloride and trichloromonofluoromethane). Water is the most preferred blowing agent. The blowing agent may be contained in the isocyanate (if it is inert towards the isocyanate), added to the isocyanate-reactive component, injected into the reaction mixture, or generated in situ by a chemical reaction. The amount of blowing agent used is preferably less than about 10% by weight of the total reactants.

When water is employed as the blowing agent, it can be introduced as a separate stream at the time of reaction or it can be included in the isocyanate-reactive component and is generally used in amounts of from about 0.5 to 10%, preferably about 1.0 to about 8.0% and most preferably about 2.0 to about 8.0% by weight. When water is used as the blowing agent, it reacts with the polyisocyanate to produce carbon dioxide and/or with an imine or enamine to form volatile carbonyl compounds.

The density, the cell content, the cell size and the skin (surface) quality of the polyurethane or polyurea foam will be determined by the selection of reactants and concentration of blowing agents. The types and amounts of reactants and blowing agents can be varied to produce an article having specific properties needed for a particular end use.

When preparing polyurethane and polyurea flexible foam molded articles, it is preferred to pretreat the surfaces of the mold tool with an external mold release compound. Metal mold surfaces can be prepared, e.g., by stripping the mold of organic matter employing N-methyl pyrrolidinone, cleaning the mold with mineral spirits, and then wiping the mold dry with a towel to expose a clean bare metal. A wax base coat or spray soap coat is then applied. With some compositions, the wax or soap base coat treatment is sufficient. However, in other cases, additional releases may be obtained by further spraying a soap solution over the wax or soap base coat. It is noted that the fatty polyamine mold release agents of this invention perform best with pre-treated metal mold surfaces.

The fatty polyamines are particularly useful as internal mold release agents in the preparation of flexible foams, especially low density flexible foams. The flexible foams which are produced using the fatty polyamine internal mold release agents of this invention preferably have a specific gravity of 0.5 or less, and most preferably have a specific gravity of 0.25 or less. Also, flexible foams prepared with the present compositions have densities of less than 500 kg/m$^3$, preferably less than 250 kg/m$^3$ and most preferably less than 100 kg/m$^3$. The use of fatty polyamines in the preparation of polyurethane and polyurea flexible foam molded articles permits multiple molded articles to be readily removed from the mold without the need for repeating the mold surface treatment described above. The low cost and the high solubility of the fatty polyamines permits polyurethane and polyurea foamed articles to be economically produced. The fatty polyamines do not detract significantly from foam physical properties, when used at levels required for release performance.

The invention is illustrated but not limited by the following examples in which all parts are by weight unless otherwise indicated.

EXAMPLES

1. A polyol-containing composition was prepared by mixing together 78 parts of F-2805, which is an ethylene oxide capped polyoxypropylene triol having a molecular weight of 6,000 available from ICI Americas Inc., 20 parts of F-3001, which is an ethylene oxide capped polyoxypropylene diol having a molecular weight of 1900 also available from ICI Americas Inc., 2 parts of Formez 6022-29, which is a polypropylene oxide/ethylene oxide block diol available from Witco Chemical Co., 3.6 parts of water, 0.5 part of Niax 174, which is a mixed amine catalyst in dipropylene glycol available from Union Carbide, 0.2 part of Dabco 33LV, which is triethylenediamine in dipropylene glycol available from Air Products, and 0.5 part of B4690, which is a silicone surfactant available from Goldschmidt Chemical Corporation.

An isocyanate-reactive composition was prepared by adding two parts of Tallow Diamine®, which is a fatty diamine having the formula $CH_2-(CH_2)_{17}-NH-(CH_2)_3-NH_2$ available from Exxon Chemical Company, to 104.8 parts of the polyol-containing composition prepared above. The resulting isocyanate-reactive composition has a "softblock" (i.e., high molecular weight flexible polyol) content of 93.6 wt %. The isocyanate-reactive composition was added to a storage compartment of a Cannon H-40 foam machine and maintained at a temperature of 27° C. Rubinate® 28A, which is an MDI prepolymer having a free isocyanate content of about 25% and an average isocyanate equivalent weight of about 168 available from ICI Americas Inc., was added to another compartment of the Cannon machine and maintained at a temperature of 32° C. The isocyanate and the isocyanate-reactive composition were then metered for 2.27 seconds into a 41 cm×41cm×20cm aluminum block mold at a pressure of 150 bar and throughput rate of 89 g/sec for the isocyanate and a throughput rate of 153 g/sec for the isocyanate-reactive composition so that the weight ratio of isocyanate to isocyanate-reactive component was 58:100. The mold had been previously coated with CT-100, which is available from Chem-Trend and is comprised of 65 to 75% by weight hydrocarbon naphtha and 25 to 35 percent by weight wax blends, and with PRC 777, which is available from Chem-Trend and is comprised of 50 to 60 percent by weight mineral spirits and 30 to 40 percent by weight naphtha.

The resulting flexible polyurethane foam had a density of 2.59 pounds per cubic foot (pcf). The molding procedure was continued to determine how many consecutive releases could be obtained before the external mold release had to be reapplied. 15 consecutive releases were obtained.

2. Example 1 was repeated except that no fatty diamine was included in the isocyanate-reactive composition. Only one release from the mold was obtained before the external mold release had to be reapplied. The foam had a density of 2.96 pcf.

3. Example 1 was repeated except that one part of the fatty diamine was used instead of two. Five mold releases were obtained.

4. Example 1 was repeated except that octadecylamine (a monoamine) was used instead of the diamine. Two consecutive mold releases were obtained.

5. Example 1 was repeated except that a fatty tetramine having the formula $CH_3-(CH_2)_{17}-NH-(CH_2)_3-NH-(CH_2)_3-NH_2$ was employed. The tetramine was Tallow Tetramine® available from Exxon Chemical Company. Fifteen consecutive mold releases were obtained.

The examples demonstrate that the fatty polyamines of the present invention serve as effective internal mold release agents for flexible foams and that fatty polyamines are more effective than fatty monoamines. The examples also illustrate that employment of the fatty polyamines reduces the foam density.

The present invention may be embodied in other specific forms without departing from the spirit or essential attributes thereof and accordingly, reference should be made to the appended claims, rather than to the foregoing specification, as indicating the scope of the invention.

What is claimed is:

1. An isocyanate-reactive composition for use in the manufacture of flexible foam, comprising:
   (a) at least one compound having a plurality of isocyanate-reactive groups; and
   (b) an internal mold release agent consisting essentially of a fatty polyamine having the formula $$R^1\text{—}(NH\text{—}R^2)_x\text{—}NH_2$$

wherein $R^1$ is an alkyl group containing 8 to 40 carbon atoms, $R^2$ is a divalent linking group containing 1 to 8 carbon atoms, and x has a value in the range of 1 to 4.

2. The composition of claim 1 wherein $R^1$ is an alkyl group containing 12 to 35 carbon atoms, $R^2$ is an alkylene group containing 2 to 4 carbon atoms, and x has a value in the range of 1 to 3.

3. The composition of claim 1 wherein $R^1$ is selected from the group consisting of linear decyl, dodecyl, hexadecyl and octadecyl.

4. The composition of claim 2 wherein $R^1$ is octadecyl, $R^2$ is $-(CH_2)_3-$ and x has a value in the range of 1 to 3.

5. The composition of claim 1 wherein the compound containing a plurality of isocyanate-reactive groups is selected from the group consisting of polythioether, polyester, polyesteramide, polycarbonate, polyacetal, polyolefin, polysiloxane and polyether polyols.

6. The composition of claim 5 wherein said compound containing a plurality of isocyanate-reactive groups comprises 10 to 99% of a compound having a molecular weight of 1500 to 10,000.

7. The composition of claim 5 wherein the polyol is a polyether polyol.

8. The composition of claim 7 wherein the polyether polyol is selected from the group consisting of polyoxyethylene, polyoxypropylene, and poly(oxyethylene-oxypropylene) diols and triols.

9. A reaction system for preparing flexible polyurethane or polyurea articles comprising:
   (a) an organic polyisocyanate; and
   (b) an isocyanate-reactive composition comprising:
      (i) at least one compound having a plurality of isocyanate-reactive groups; and
      (ii) an internal mold release agent consisting essentially of a fatty polyamine having the formula $$R^1\text{—}(NH\text{—}R^2)_x\text{—}NH_2$$

wherein $R^1$ is an alkyl group containing 8 to 40 carbon atoms, $R^2$ is a divalent linking group containing 1 to 8 carbon atoms, and x has a value in the range of 1 to 4.

10. The reaction system of claim 9 wherein $R^1$ is an alkyl group containing 12 to 35 carbon atoms, $R^2$ is an alkylene group containing 2 to 4 carbon atoms, and x has a value in the range of 1 to 3.

11. The reaction system of claim 9 wherein $R^1$ is selected from the group consisting of linear decyl, dodecyl, hexadecyl and octadecyl.

12. The reaction system of claim 10 wherein $R^1$ is octadecyl, $R^2$ is $-(CH_2)_3-$ and x has a value in the range of 1 to 3.

13. The reaction system of claim 9 wherein the polyisocyanate is an aromatic polyisocyanate.

14. The reaction system of claim 11 wherein the polyisocyanate is selected from the group consisting of 4,4'-diphenylmethane diisocyanate, 2,4'-diphenylmethane diisocyanate, polymeric MDI, an MDI variant, and mixtures thereof.

15. The reaction system of claim 9 wherein the polyisocyanate comprises an isocyanate-terminated prepolymer.

16. The reaction system of claim 13 wherein the isocyanate-terminated prepolymer is the reaction product of an MDI stream and a polyol.

17. The reaction system of claim 9 wherein the compound containing a plurality of isocyanate reactive groups is selected from the group consisting of polythioether, polyester, polyesteramide, polycarbonate, polyacetal, polyolefin, polysiloxane and polyether polyols.

18. The composition of claim 17, wherein said compound containing a plurality of isocyanate-reactive groups comprises 10 to 99% of a compound having a molecular weight of 1500 to 10,000.

19. The reaction system of claim 17 wherein the polyol is a polyether polyol.

20. The reaction system of claim 19 wherein the polyether polyol is selected from the group consisting of polyoxyethylene, polyoxypropylene and poly(oxyethylene-oxypropylene) diols and triols.

21. A process for preparing a molded polyurethane or polyurea flexible foam article comprising the steps of:
   (a) introducing into a mold an organic polyisocyanate and an isocyanate-reactive composition comprising:
      (i) at least one compound having a plurality of isocyanate-reactive groups; and
      (ii) an internal mold release agent consisting essentially of a fatty polyamine having the formula:

$$R^1\text{—}(NH\text{—}R^2)_x\text{—}NH_2$$

wherein $R^1$ is an alkyl group containing 8 to 40 carbon atoms, $R^2$ is a divalent linking group containing 1 to 8 carbon atoms, and x has a value in the range of 1 to 4;
   (b) reacting the polyisocyanate and the isocyanate-reactive composition to form a molded article; and
   (c) removing the molded article from the mold.

22. A process for preparing a molded polyurethane or polyurea flexible foam article comprising the steps of:
   (a) introducing into a mold an organic polyisocyanate, a blowing agent, and an isocyanate reactive composition comprising:
      (i) at least one compound having a plurality of isocyanate-reactive groups; and
      (ii) an internal mold release agent consisting essentially of a fatty polyamine having the formula:

$$R^1\text{—}(NH\text{—}R^2)_x\text{—}NH_2$$

wherein $R^1$ is an alkyl group containing 8 to 40 carbon atoms, $R^2$ is a divalent linking group containing 1 to 8 carbon atoms, and x has a value in the range of 1 to 4;
   (b) reacting the polyisocyanate, the blowing agent and the isocyanate-reactive composition to form a molded flexible foam article; and
   (c) removing the molded article from the mold.

23. The process of claim 19 wherein the article is a low density flexible foam article.

24. The process of claim 20 wherein the article is a low density flexible foam article.

25. The process of claim 20 wherein the blowing agent comprises water.

* * * * *